(12) United States Patent
Costello et al.

(10) Patent No.: US 7,637,094 B2
(45) Date of Patent: Dec. 29, 2009

(54) COOLING APPARATUS FOR A GAS TURBINE ENGINE IGNITER LEAD

(75) Inventors: Hugh Marshall Costello, Hamilton, OH (US); Richard Walter Gronostaj, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 782 days.

(21) Appl. No.: 11/303,705

(22) Filed: Dec. 16, 2005

(65) Prior Publication Data

US 2007/0137210 A1 Jun. 21, 2007

(51) Int. Cl.
*F02C 7/264* (2006.01)
*F02G 1/055* (2006.01)

(52) U.S. Cl. .................. 60/39.821; 174/15.1
(58) Field of Classification Search .............. 60/39.821; 174/15.1
See application file for complete search history.

(56) References Cited

U.S. PATENT DOCUMENTS

| | | | | |
|---|---|---|---|---|
| 2,831,993 A | * | 4/1958 | Lentz | .................. 313/11.5 |
| 3,736,748 A | * | 6/1973 | Walker et al. | ............ 60/39.827 |
| 3,800,530 A | | 4/1974 | Nash | |
| 3,990,834 A | | 11/1976 | DuBell et al. | |
| 4,814,664 A | | 3/1989 | Rothenbuhler | |
| 5,283,499 A | * | 2/1994 | Adam et al. | ................ 313/135 |
| 5,367,869 A | * | 11/1994 | DeFreitas | .................... 60/776 |
| 5,367,871 A | * | 11/1994 | Venkataramani et al. | . 60/39.821 |
| 5,515,681 A | * | 5/1996 | DeFreitas | .................... 60/740 |
| 5,813,221 A | | 9/1998 | Geiser et al. | |
| 6,232,703 B1 | * | 5/2001 | Huffman | .................... 313/140 |
| 6,438,940 B1 | | 8/2002 | Vacek et al. | |
| 6,483,022 B1 | * | 11/2002 | Packard | .................... 174/15.1 |
| 6,603,216 B2 | | 8/2003 | Costello | |
| 7,065,956 B2 | * | 6/2006 | Johnson | .................... 60/39.821 |
| 7,124,724 B2 | * | 10/2006 | Fleetwood | .............. 123/143 C |
| 7,448,216 B2 | * | 11/2008 | McCaffrey et al. | ............ 60/772 |
| 7,509,812 B2 | * | 3/2009 | Mehrer et al. | ................ 60/778 |

\* cited by examiner

*Primary Examiner*—William H Rodriguez
(74) *Attorney, Agent, or Firm*—William Scott Andes, Esq.; Armstrong Teasdale LLP

(57) ABSTRACT

A method for cooling an igniter lead is provided. The method includes coupling an assembly to the igniter lead such that a portion of the assembly rotates circumferentially around the igniter lead, and channeling cooling air through the assembly to facilitate cooling the igniter lead.

6 Claims, 4 Drawing Sheets

US 7,637,094 B2

COOLING APPARATUS FOR A GAS TURBINE ENGINE IGNITER LEAD

BACKGROUND OF THE INVENTION

This invention relates generally to gas turbine engines, and more particularly, to a method and apparatus utilized to cool igniter leads used with gas turbine engines.

Gas turbine engines typically include high and low pressure compressors, a combustor, and at least one turbine. The compressors compress air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

Gas turbine engines typically include an ignition system to ignite the fuel and air mixture within the gas turbine engine. At least one known gas turbine engine ignition system includes an exciter, at least one igniter, and a lead coupled between the exciter and the igniter. During operation, the igniter lead may be subject to an operational temperature that may cause the igniter lead to deteriorate. As a result, the engine may fail to start and may fail to support required operations.

BRIEF SUMMARY OF THE INVENTION

In one aspect, a method for cooling an igniter lead is provided. The method includes coupling an assembly to the igniter lead such that a portion of the assembly rotates circumferentially around the igniter lead, and channeling cooling air through the assembly to facilitate cooling the igniter lead.

In another aspect, a cooling apparatus for an igniter lead is provided. The cooling apparatus includes a conduit coupled to the igniter lead, and an outer housing coupled to the conduit. The outer housing swivels 360 degrees circumferentially around the conduit.

In a further aspect, a gas turbine engine is provided. The gas turbine engine includes an exciter, an igniter, at least one igniter lead extending between the exciter and the igniter, and a cooling apparatus. The cooling apparatus includes a conduit and an outer housing.

DETAILED DESCRIPTION OF THE INVENTION

Figure 1:
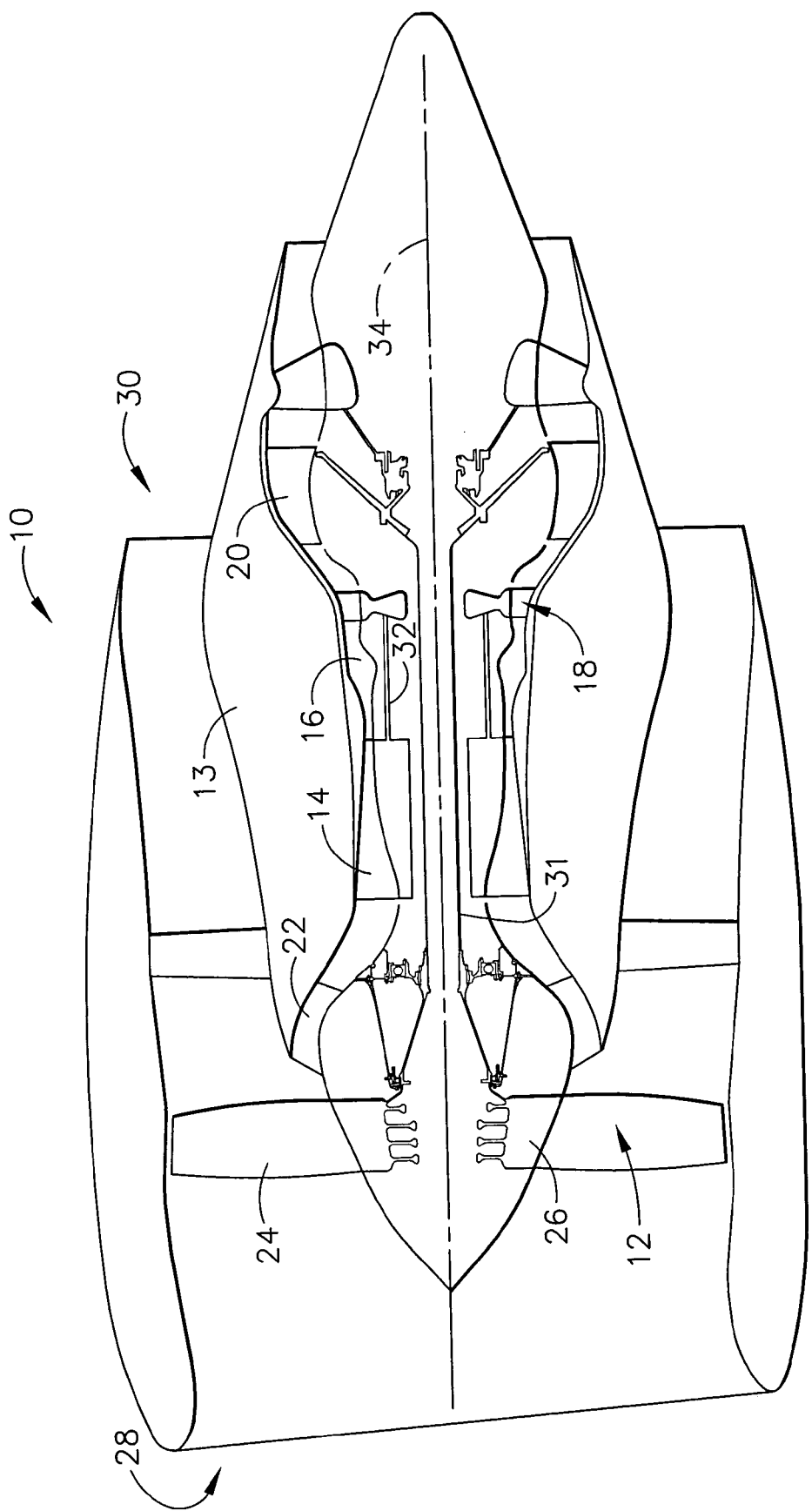
FIG. 1 is a schematic illustration of an exemplary gas turbine engine.

Referring to the drawings, FIG. 1 is a schematic illustration of a gas turbine engine 10 that includes a fan assembly 12 and a core engine 13 including a high pressure compressor 14, a combustor 16, and a high pressure turbine 18. Engine 10 also includes a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 32.

During operation, air flows through fan assembly 12, along a central axis 34, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
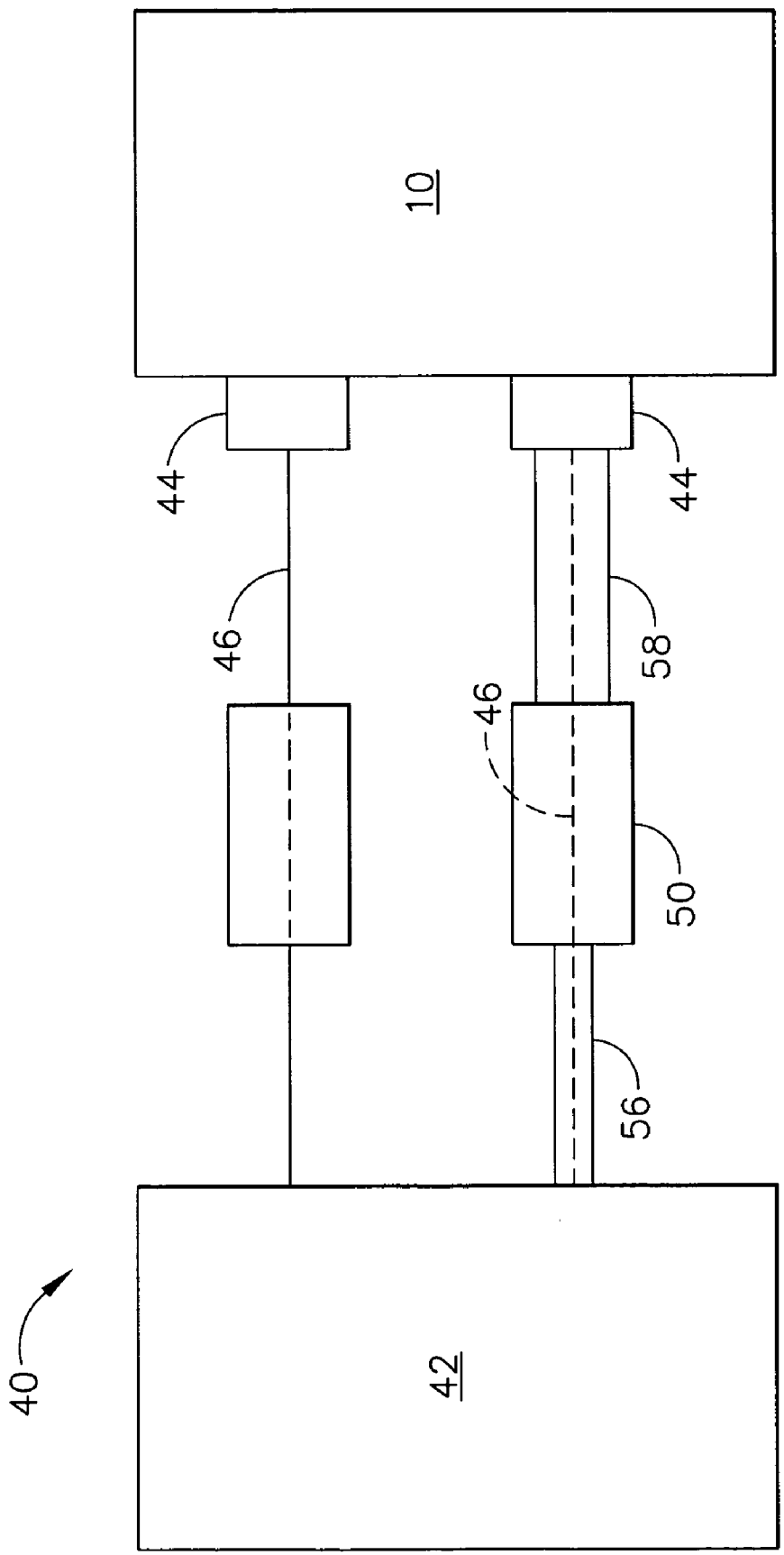
FIG. 2 is a schematic illustration of an ignition system in a gas turbine engine shown in FIG. 1.

FIG. 2 is a schematic illustration of an exemplary ignition system 40 that may be used with gas turbine engine 10 (shown in FIG. 1). Ignition system 40 includes an exciter 42, at least one igniter 44, and at least one igniter lead 46 coupled between exciter 42 and igniter 44. In the exemplary embodiment, ignition system 40 also includes a cooling apparatus 50 that channels cooling air around the igniter lead 46 to facilitate cooling the igniter lead 46. Igniter lead 46 in the exemplary embodiment is covered with a braided wire cover 56. Outer jacket 58 covers igniter lead 46 between cooling apparatus 50 and igniter 44.

Figure 3:
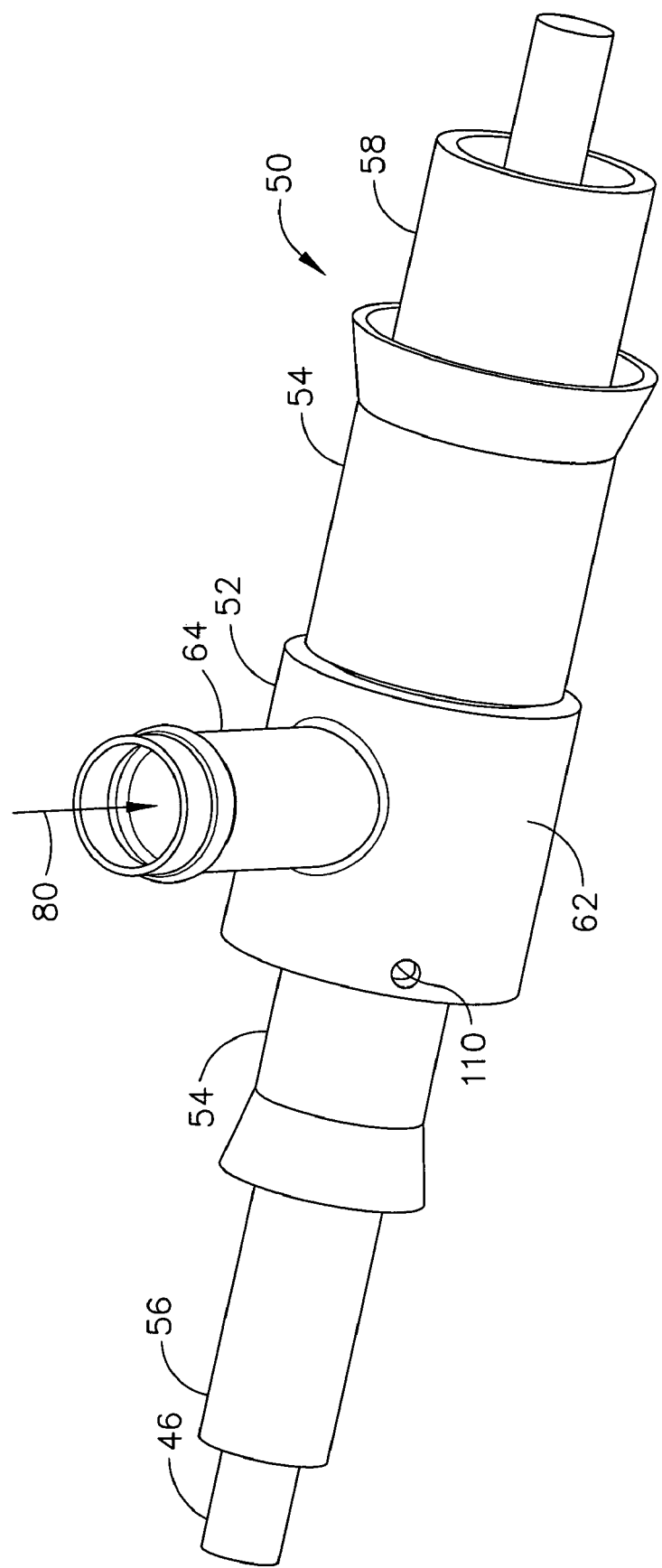
FIG. 3 is a schematic illustration of a cooling apparatus for an igniter lead shown in FIG. 2.
Figure 4:
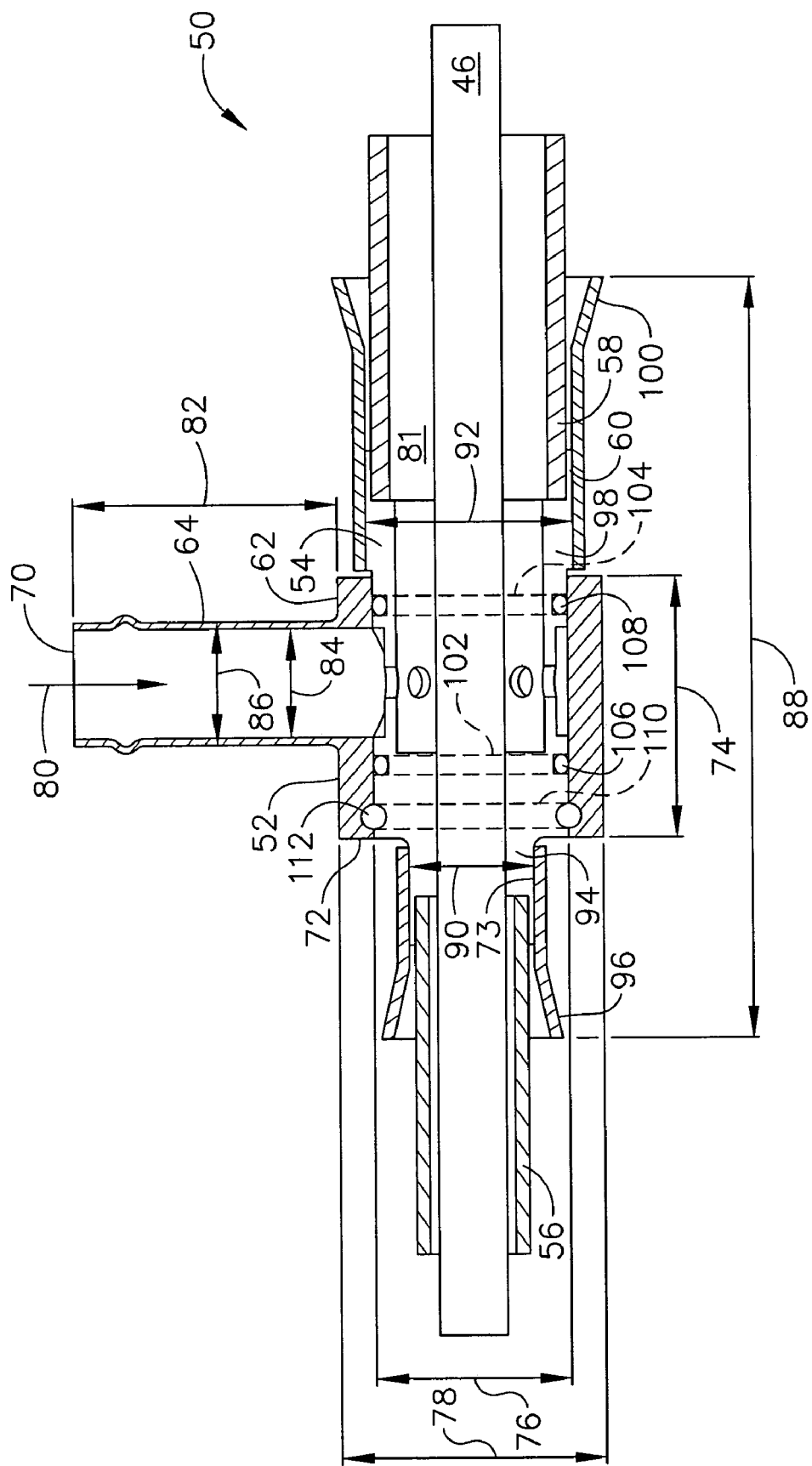
FIG. 4 is a cross-section illustration of a cooling apparatus for an igniter lead shown in FIG. 3.

FIG. 3 is a schematic illustration of cooling apparatus 50 shown in FIG. 2. FIG. 4 is a cross-section illustration of a cooling apparatus for an igniter lead shown in FIG. 3. Cooling apparatus 50 includes an outer housing 52 and a conduit 54. In the exemplary embodiment, cooling apparatus 50 is fabricated from a metallic material. Optionally, cooling apparatus 50 is fabricated from a non-metallic material (i.e. a composite material).

Outer housing 52 includes a first tubular portion 62 and a second tubular portion 64. In the exemplary embodiment, first tubular portion 62 is unitarily formed with second tubular portion 64. First tubular portion 62 is substantially perpendicular with respect to second tubular portion 64. First tubular portion 62 is substantially cylindrical and has an opening 72 defined therethrough. First tubular portion 62 includes a length 74, an inner diameter 76, and an outer diameter 78. Second tubular portion 64 is substantially cylindrical and has an opening 70 defined therethrough. Second tubular portion 64 has a length 82, an inner diameter 84, and an outer diameter 86. First tubular portion 62 includes an opening 110 defined therethrough configured to receive a retaining device 112. In the exemplary embodiment, retaining device 112 is a wire retainer. Second tubular portion 64 forms the beginning of the air channel 80. Second tubular portion 64 is in flow communication with first tubular portion 62. Therefore, air channel 80 is further formed by first tubular portion 62.

Conduit 54 is substantially cylindrical and has an opening 73 defined therethrough. Conduit 54 includes a length 88, a first end 94 including an outer diameter 90, and a second end 98 including an outer diameter 92 that is larger than outer diameter 90. First end 94 of conduit 54 couples to a first bell mouth portion 96. Second end 98 of conduit 54 couples to a second bell mouth portion 100. Optionally, conduit 54 does not include a first bell mouth portion 96 and a second bell mouth portion 100. Furthermore, outer jacket 58 is partially inserted into second end 98 wherein second end 98 forms a flange 60 with a portion of outer jacket 58. Outer jacket 58 forms a shoulder with conduit 54.

Additionally, conduit 54 has a first groove 102 that is sized to receive a first seal 106 and is positioned between first end 94 and a second groove 104. Second groove 104 is sized to receive a second seal 108 and is positioned between first groove 102 and second end 98. First seal 106 and second seal 108 are each circumferentially disposed around conduit 54. First seal 106 and second seal 108 facilitate flow communication between outer housing 52 and conduit 54. Hence, first seal 106 and second seal 108 further form air channel 80. In the exemplary embodiment, first seal 106 and second seal 108 are o-rings.

During assembly, igniter lead 46 is inserted at least partially into conduit 54 through first bell mouth portion 96, continues through opening 73, and exits conduit 54 through second bell mouth portion 100. First bell mouth portion 96 and second bell mouth portion 100 facilitate bending igniter lead 46. If first bell mouth portion 96 and second bell mouth portion 100 are not utilized, igniter lead 46 is inserted at least partially into conduit 54 through first end 94, continues through opening 73, and exits conduit 54 through second end 98. Conduit 54 is inserted through first tubular portion 62 of outer housing 52 through opening 72. Inner diameter 76 is slightly larger than outer diameter 92. Furthermore, length 88 of conduit 54 is longer than length 82 of the outer housing 52. First tubular portion 62 of outer housing 52 substantially circumscribes and is rotatably coupled to conduit 54. First tubular portion 62 of outer housing 52 is in sealable contact with first seal 106 and second seal 108. Outer housing 52 rotates 360 degrees circumferentially around conduit 54. Outer housing 52 is rotated to couple to an external air source. Cooling air enters at opening 70 and continues through air channel 80. Retaining device 112 is inserted at least partially into opening 110 and retaining device 112 is configured to secure the outer housing 52 in a substantially fixed orientation with respect to the conduit 54.

During operation, outer housing 52 is rotated to couple to an external air source. Cooling air enters at opening 70 and continues through air channel 80. Second tubular portion 64 forms the beginning of the air channel 80. Second tubular portion 64 is in flow communication with first tubular portion 62. Seal 106 and seal 108 provide a seal for cooling air to pass from air channel 80 through to air cavity 81. Air cavity 81 is defined between outer jacket 58 and the igniter lead 46. Outer jacket 58 substantially circumscribes igniter lead 46. From air channel 80, cooling air passes into air cavity 81 cooling the igniter lead 46. The cooling assembly 50 provides a passageway for cooling air to reach the igniter lead 46 such that the temperature of the lead is reduced from a first operational temperature to a second operational temperature that is less than the first operational temperature.

The above-described cooling assembly is cost-effective and highly reliable. The assembly includes a conduit and an outer housing. The outer housing provides a 360 degree rotation to allow freedom in configuration of design of the air supply plumbing. The assembly provides a passageway for cooling air to reach the igniter lead such that the temperature of the lead is reduced from a first operational temperature to a second operational temperature that is less than the first operational temperature.

More specifically, the proposed swivel air fitting tee for an aircraft engine igniter lead has an outer housing. The outer housing swivels 360 degrees around the igniter harness. The wire shielded igniter harness enters the fitting and attaches to the fixed adapter body. The outer housing attaches to the fixed body with the wire retainer. The two O-rings provide a static air seal at the end of the housing and at the end of the body. Air passes through the tee of the outer housing and enters the chamber of the fixed body. From the air chamber, cooling air then passes into the cooling jacket surrounding the igniter lead. The direction of the flow would be reversed for a drain application.

While this application exhibits the use of a beaded end for a hose connection, any type of connection is possible here for other applications. Therefore, the approach is not limited to a beaded end at the tee connection. Furthermore, bell mouths are provided at each end of the connector to assist in the lead bend radius at the fitting ends.

While the invention has been described in terms of various specific embodiments, those skilled in the art will recognize that the invention can be practiced with modification within the spirit and scope of the claims.

What is claimed is:

1. A gas turbine engine comprising:
   an exciter;
   an igniter;
   at least one igniter lead extending between the exciter and the igniter; and
   a cooling apparatus comprising:
   a conduit coupled to the igniter lead; and
   an outer housing coupled to said conduit wherein said outer housing swivels 360 degrees circumferentially around said conduit.

2. A gas turbine engine in accordance with claim 1 wherein said conduit comprises a tubular body portion including a first end and a second end, said body portion configured to substantially circumscribe the igniter lead.

3. A gas turbine engine in accordance with claim 2 wherein said conduit further comprises a first groove that is sized to receive a first seal that is positioned proximate said first end and a second groove that is sized to receive a second seal that is positioned between said first groove and said second end, said first and second seals are each circumferentially disposed around said body portion of said conduit, to facilitate seals forming a sealed air channel between said outer housing and said body portion.

4. A gas turbine engine in accordance with claim 3 wherein said outer housing includes a first tubular portion and a second tubular portion that is coupled to said first tubular portion, said outer housing is coupled to said conduit such that said first tubular portion circumscribes and is substantially parallel to said conduit, said second tubular portion is substantially perpendicular to said first tubular portion and said conduit.

5. A gas turbine engine in accordance with claim 4 wherein said outer housing includes an opening in said first tubular portion, said opening is configured to receive a retaining device to secure said outer housing in a substantially fixed orientation with respect to said conduit.

6. A gas turbine engine in accordance with claim 5 wherein said second tubular member attaches to an external air source; and said second tubular member channels cooling air from the external air source through to said first tubular member, through said first and second seal, through said conduit, and around the igniter lead.

* * * * *

UNITED STATES PATENT AND TRADEMARK OFFICE
CERTIFICATE OF CORRECTION

| | | |
|---|---|---|
| PATENT NO. | : 7,637,094 B2 | Page 1 of 1 |
| APPLICATION NO. | : 11/303705 | |
| DATED | : December 29, 2009 | |
| INVENTOR(S) | : Costello et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1047 days.

Signed and Sealed this

Ninth Day of November, 2010

David J. Kappos
*Director of the United States Patent and Trademark Office*